United States Patent
Hiestermann et al.

(10) Patent No.: US 8,290,695 B2
(45) Date of Patent: Oct. 16, 2012

(54) METHOD FOR COMPUTING AN ENERGY EFFICIENT ROUTE

(76) Inventors: Volker Hiestermann, Laatzen (DE); Robert Joannes Van Essen, Amsterdam (NL); Edwin Bastiaensen, Beersel (BE); Stephen T'Siobbel, Merelbeke (BE)

( * ) Notice: Subject to any disclaimer, the term of this patent is extended or adjusted under 35 U.S.C. 154(b) by 0 days.

(21) Appl. No.: 13/144,959

(22) PCT Filed: Jan. 13, 2010

(86) PCT No.: PCT/EP2010/050363

§ 371 (c)(1), (2), (4) Date: Sep. 6, 2011

(87) PCT Pub. No.: WO2010/081836

PCT Pub. Date: Jul. 22, 2010

(65) Prior Publication Data

US 2011/0307166 A1     Dec. 15, 2011

(30) Foreign Application Priority Data

Jan. 16, 2009  (GB) ................................. 0900659.4
Jan. 16, 2009  (GB) ................................. 0900678.4

(51) Int. Cl.
*G08G 1/00*     (2006.01)

(52) U.S. Cl. ............ 701/119; 701/70; 701/79; 701/117; 701/121; 701/532; 340/454; 340/461; 340/660; 340/905; 340/989; 342/202; 15/42; 709/224; 33/556; 33/559

(58) Field of Classification Search ................. 701/70, 701/79, 117, 119; 340/454, 461, 905, 989, 340/660; 342/202, 522, 536, 686, 750.03; 15/42; 702/104; 29/593; 709/224; 33/556, 33/559; 379/112.05; 716/111

See application file for complete search history.

(56) References Cited

U.S. PATENT DOCUMENTS 5,442,953 A * 8/1995 Fisher et al. .................... 73/105

(Continued)

FOREIGN PATENT DOCUMENTS

EP      1 172 631 A1    1/2002

(Continued)

OTHER PUBLICATIONS

International Search Report dated Jul. 22, 2010 from International Patent Application PCT/EP2010/050364, the ISA was the EPO.

(Continued)

*Primary Examiner* — James Trammell
*Assistant Examiner* — McDieunel Marc

(57) ABSTRACT

Probe data is analyzed to derive Longitudinal Speed Profiles (LSPs) and an Optimal Longitudinal Speed Profile (18) for each road segment or link in a digital map network. The Longitudinal Speed Profiles (LSPs) profiles are calculated during defined time spans whereas the Optimal Longitudinal Speed Profile (18) is based on the LSP for the time span corresponding only to free flow traffic conditions. All of the LSPs can used to create a respective energy cost for each time span, or only the OLSP (18) can be used (or alternatively the RRDSL 16 or LRRDSL 17) to calculate an energy cost for the free flow conditions only. The energy cost can be used to predict the energy required by a vehicle to traverse the link. Navigation software can use the energy cost to plan the most energy efficient route between two locations in the digital map. Sensory signals can be activated if a driver strays from the Optimal Longitudinal Speed Profile (18) to achieve extremely high levels of energy efficiency.

11 Claims, 11 Drawing Sheets

U.S. PATENT DOCUMENTS

| | | | |
|---|---|---|---|
| 6,061,625 A | 5/2000 | Fastenrath | |
| 6,178,374 B1 | 1/2001 | Moehlenkamp | |
| 6,341,357 B1 * | 1/2002 | Ravichandran | 714/38.1 |
| 6,549,841 B1 | 4/2003 | Axelsson | |
| 6,804,602 B2 * | 10/2004 | Impson et al. | 701/117 |
| 7,072,813 B2 * | 7/2006 | Billemaz et al. | 703/6 |
| 2002/0120389 A1 | 8/2002 | Fushiki | |
| 2002/0162092 A1 * | 10/2002 | Ravichandran | 717/127 |
| 2004/0030670 A1 | 2/2004 | Barton | |
| 2004/0093197 A1 * | 5/2004 | Billemaz et al. | 703/13 |
| 2006/0074546 A1 | 4/2006 | DeKock | |
| 2007/0112475 A1 | 5/2007 | Koebler | |
| 2007/0294023 A1 * | 12/2007 | Arcot et al. | 701/117 |
| 2008/0071472 A1 | 3/2008 | Yamada | |
| 2008/0221787 A1 | 9/2008 | Vavrus | |
| 2008/0242315 A1 * | 10/2008 | Ferman | 455/456.2 |
| 2008/0294339 A1 | 11/2008 | Tauchi | |
| 2009/0138497 A1 * | 5/2009 | Zavoli et al. | 707/102 |
| 2009/0195255 A1 * | 8/2009 | Kalokitis et al. | 324/522 |
| 2009/0322342 A1 * | 12/2009 | Keil et al. | 324/464 |
| 2010/0070175 A1 * | 3/2010 | Soulchin et al. | 701/210 |
| 2010/0250127 A1 | 9/2010 | Hilbrandie | |
| 2010/0286907 A1 | 11/2010 | Hilbrandie | |
| 2010/0299055 A1 | 11/2010 | Hilbrandie | |
| 2010/0299064 A1 | 11/2010 | Hilbrandie | |
| 2010/0312472 A1 | 12/2010 | Hilbrandie | |
| 2012/0004845 A1 * | 1/2012 | Kmiecik et al. | 701/445 |
| 2012/0022781 A1 * | 1/2012 | Wilson | 701/410 |

FOREIGN PATENT DOCUMENTS

| | | |
|---|---|---|
| EP | 1 973 078 A1 | 9/2008 |
| WO | WO 2009 053405 A1 | 4/2009 |
| WO | WO 2009/053406 A1 | 4/2009 |
| WO | WO 2009/053407 A1 | 4/2009 |
| WO | WO 2009/053408 A1 | 4/2009 |
| WO | WO 2009/053410 A1 | 4/2009 |
| WO | WO 2009/053411 A1 | 4/2009 |

OTHER PUBLICATIONS

International Search Report dated Jul. 22, 2010 from International Patent Application PCT/EP2010/050363, the ISA was the EPO.

* cited by examiner

FIG. 5 Longitudinal Speed Profile (LSPs) for a Road Segment (Time Spans = 30 min.)

METHOD FOR COMPUTING AN ENERGY EFFICIENT ROUTE

STATEMENT OF COPYRIGHTED MATERIAL

This application is the National Stage of International Application No. PCT/EP2010/050363, filed Jan. 13, 2010 and designating the United States. The entire contents of this application is incorporated herein by reference.

A portion of the disclosure of this patent document contains material which is subject to copyright protection. The copyright owner has no objection to the facsimile reproduction by anyone of the patent document or the patent disclosure, as it appears in the PTO patent file or records, but otherwise reserves all copyright rights whatsoever.

BACKGROUND OF THE INVENTION

1. Field of the Invention

This invention relates to digital maps of the type for displaying road or pathway information, and more particularly toward a method for supplementing a digital map with data to enable various traffic modeling actions and to calculate an energy efficient route that can be offered to a driver.

2. Related Art

Personal navigation devices like that shown generally at 10 in FIG. 1, for example, utilize digital maps combined with accurate positioning data from GPS or other data streams. These devices 10 have been developed for commuters seeking navigation assistance, for businesses trying to minimize transportation costs, and many other useful applications. The effectiveness of such navigation systems is inherently dependent upon the accuracy and completeness of the information provided to it in the forms of digital maps and associated features and attribute data. Likewise, the effectiveness of such navigation systems is also dependent upon accurately and quickly matching the actual, real-world location of the navigation device to a corresponding portion of the digital map. Typically, a navigation system 10 includes a display screen 12 or graphic user interface that portrays a network of streets as a series of line segments, including a center line running approximately along the center of each street or path, as exemplified in FIG. 1. The traveler can then be generally located on the digital map close to or with regard to that center line. Such GPS-enabled personal navigation devices, such as those manufactured by TomTom N.V. (tomtom.com), may be also configured as probes to record its position at regular intervals. Such probe data points comprise a sequence of discrete positions recorded at a particular time of the day taken at intervals of, for example, one second. Of course, other suitable devices may be used to generate probe data points including handheld devices, mobile phones, PDAs, and the like.

Maximizing energy efficiency is a universal goal. It is known, for example, that vehicles driven with frequent start-stop type motions are very energy inefficient due to the acceleration and deceleration aspects of this type of driving. Conversely, maintaining a vehicle at a steady speed, particularly in the range of about 45-60 mph, is far more energy efficient.

Navigation devices are well known for their ability to plan a route between two locations in a digital map. For example, as shown in FIG. 2, a traveler originating in Detroit may select a destination of Los Angeles in the digital map and activate an algorithm to calculate a route between the two locations. When alternate routes are possible, such route planning may be carried out on the basis of the shortest distance between origination and destination points. Or, if links in the network include associated travel time attributes, it is possible to recommend the route which indicates the shortest travel time. Other variables may include planning a route based on points of interest, and the like.

Some prior art devices have proposed the calculation of a route between origination and destination points based on fuel economy, carbon footprint and fuel pricing. For example, the ecoRoute™ offered by Garmin Ltd. uses information from a particular vehicle profile to calculate a fuel consumption estimation. That is, the user inputs details about their specific vehicle's fuel economy in both city and highway settings, selects a fuel type relative to the vehicle, and perhaps provides additional details. The system algorithm then calculates fuel consumption estimates based upon the distance to be traveled along a planned route. One particular shortcoming of this approach is that it does not rely on any speed or acceleration attribute associated with the network of links in a digital map database. Therefore, the ecoRouting function is not particularly useful as a representative planning tool. Thus, in referring then to the example of FIG. 2, a driver wishing to travel between Detroit and Los Angeles is not able to intelligently assess the most economical route to travel. Furthermore, programs like the ecoRoute™ require some burdensome user interaction with the navigation device and user knowledge about the vehicle characteristics, fuel prices, etc.

As suggested previously, it is known to take probe data points from low-cost positioning systems in handheld devices and mobile phones with integrated GPS functionality for the purpose of incrementally learning a map using certain clustering technologies. The input to be processed consists of recorded GPS traces, perhaps in the form of a standard ASCII stream or binary file. The output may be a road map in the form of a directed graph with nodes and links associated with travel time information. The probe data, which creates the nodes or probe positions at regular intervals, can be transmitted to a collection service or other map making or data analysis service. Through this method, wherein large populations of probe data are analyzed, road geometry can be inferred and other features and attributes derived by appropriate algorithms.

FIG. 3 is a representative example of raw probe data collected over a period of days from a downtown, city-center area of Ottawa, Canada. From this raw probe data, even an untrained eye can begin to discern road geometries. Each data point represented in the illustration of FIG. 3 includes information as to the particular time of day that the data point was recorded. Thus, while FIG. 3 depicts only longitudinally and laterally dispersed position data, the recorded data also provides a time stamp for each position. Furthermore, each individual probe may create a trace which can be analyzed for travel speeds, accelerations, stops, and the like.

Traditional routing methods use maximum speed limits as exist along road segments to calculate travel time estimates, however in practice speed limit information is not accurate because these speeds are not always possible at various times of the day. Speed profiles have been derived by intensively processing this probe data to create average traffic speeds for each road segment, i.e., for each section of road in the digital map, for different time slots or times of the day. See, for example, the TomTom IQ Routes™ product.

The IQ Routes™ product uses anonymous probe data to discover actual patterns in driving speeds. Typically, route calculations before IQ Routes used 0.85% of the maximum speed limit in its calculation—IQ Routes by contrast uses the speeds actually driven on those roads. (Alternatively, a likely speed value can be derived from the road classification. E.g. when legal speed limits are not available.) This data is applied to a profile model and patterns in the road speeds are identified in time spans (e.g., 5 minute increments) throughout the day. The speed profiles are applied to the road segments, building up an accurate picture of speeds using historical data. All of these speed profiles are added to the existing IQ Routes data built into the map stored in the navigation device 10, to make it even more accurate and useful for premium routing and travel time estimates. Speed profiles therefore represent a continuous or semi-continuous averaged speed distribution of vehicles derived from probe information, driving along the same section of the road and direction. Speed profiles reflect speed variations per segment per time interval, but are not longitudinally distributed in the sense that they do not describe velocity variations along the length of a link or road segment. This information can be used by a navigation system as a cost factor in connection with calculating optimal routes and providing travel/arrival time estimates.

While very useful, these prior art techniques do not provide any indication of the most efficient route between two locations represented in a digital map. Therefore, there is a need to create new and improved methods for computing routes between an origin and destination location which provides the most energy efficient strategy, and which accounts for real life conditions including both static and dynamic elements. Static elements may include features that affect traffic speed including for example sharp bends in the road, traffic controls, and other measures that affect traffic speed as a matter of geometry. Dynamic elements include traffic volumes which fluctuate during workdays with local rush hour conditions, and are affected by weekend travel, holidays and the like. There is also a need to create new and improved data that can be used in connection with a digital map, either as a separate interfacing database or as data augmented directly into an existing map database, to enable traffic modeling applications.

SUMMARY OF THE INVENTION

The invention provides a method for creating Longitudinal Speed Profile (LSP) data useful for various traffic modeling applications. Probe data is collected from a plurality of probes traversing a road segment in the form of vehicular traffic flow. Each probe develops a respective probe trace comprising a sequence of discrete probe positions recorded at a particular time of day. Daily time spans are established, e.g., every five minutes, and the probe data is bundled for each time span. The probe data is then utilized to obtain Longitudinal Speed Profiles (LSPs) for vehicles traversing the road segment during each time span. These Longitudinal Speed Profiles (LSPs) are then associated with the respective road segment and either stored in a stand-alone database or added to an existing digital map as a data layer.

The invention also contemplates a method for computing an energy efficient route between an origin location and a destination location in situations where a digital map includes a network of road segments or links extending between the origin and destination locations. Probe data is collected from probes traversing the links and then bundled and processed to obtain the Longitudinal Speed Profiles (LSPs) for each time span. Using these Longitudinal Speed Profiles (LSPs), an energy cost is calculated for at least one direction of travel supported by the link during each time span, so that a route can be planned between the origin and destination by analyzing the energy cost for alternative link combinations in the network and preferring those links which minimize the average energy consumption value.

From the detailed Longitudinal Speed Profiles (LSPs) along the links as derived from probe data, a detailed energy cost along the links can be calculated in the direction of travel, and perhaps even by lane in multi-lane roads, such as by taking the first derivative of speed over time or acquiring specific sensor data as may be available. From this information, energy cost can be introduced and used by the routing algorithms in much the same way that current routing algorithms utilize other cost factors like travel time or distance information. While a full calculation of energy cost requires additional parameters such as aerodynamic drag, rolling resistance and road grade data, it has been discovered by the applicants that an energy cost parameter can be used in at least a basic capacity to predict or estimate energy/fuel consumption characteristics without resorting to vehicle specific information such as mass, frontal area, aerodynamic drag and the like. Therefore, while these other parameters can be useful in providing a more accurate energy cost for each link in the network, it is at the most basic level sufficient to utilize only an energy cost derived from the Longitudinal Speed Profiles (LSPs) and then using this energy cost information to plan out a route between two points in a digital map.

It is known that the fuel and/or energy economic is very much dependant on the number of accelerations/decelerations to the total distance to be travelled and also on the vehicle speed. During every acceleration, the engine (or motor in electric vehicle applications) generates more excessive heat, which means the power generated by the fuel/energy consumed is transferred less efficient into the mechanical motion and at higher speed the energy consumption is higher due to factors like air resistance. During deceleration by the application of brakes, kinetic energy is converted to heat and rejected to atmosphere. Traditional brakes do not recover this energy, while electric motors may recover some energy.

This invention allows the user to plan routes containing less acceleration/deceleration points on the route and in addition to that possible lower travel speeds, thus allowing the engines to work in more efficient (closer to steady RPM) mode, which will deliver the wanted energy economy and also decrease pollution. Navigation systems operating route planning software can have an option to enter the time one can spend driving a particular optional route and see how "greener" the route will be for every time setting. Or, the person can enter the parameter of how much longer in % to the fastest time the more energy efficient route is allowed to be (as an example of one possible time setting).

A distinct advantage of this invention for planning an eco-friendly route does not necessarily require any vehicle-specific information to derive useful results, although more accurate computations can be made with the addition of vehicle-specific information. Thus, it is not absolutely necessary that the navigator know the type of vehicle the user has and what are the prices of the fuel in the nearby refueling stations. The proposed method of route planning thus takes advantage of generic knowledge about the efficiency of all vehicle engines/motors (that is, to drive with the fewest number of accelerations/decelerations) to deliver more economical routes. To this end, this method is also applicable to routing services occurring off-board or being retrieved over the web, such as on mapping and routing web sites used by internet users.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
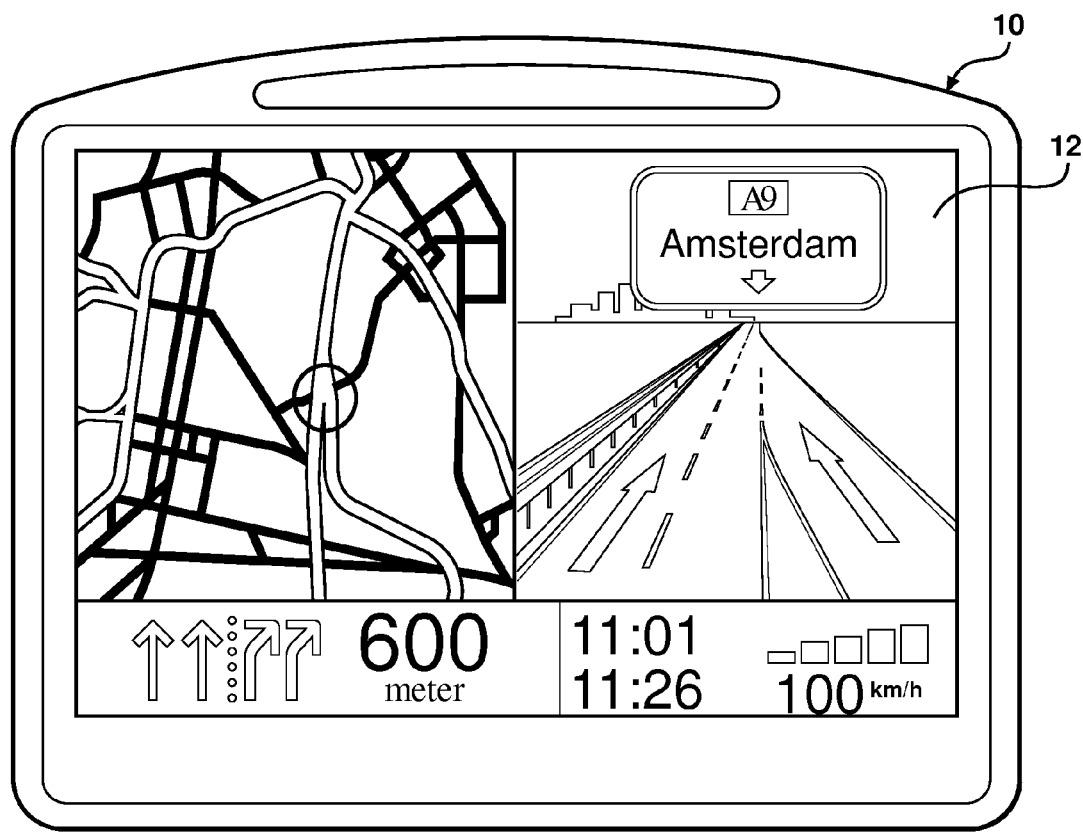
FIG. 1 is an exemplary view of a portable navigation system according to one embodiment of the subject invention including a display screen for presenting map data information and including a computer readable medium having navigation software recorded thereon.

Referring to the Figures, wherein like numerals indicate like or corresponding parts throughout the several views, this invention pertains to position reading devices, navigation systems, ADAS systems with GNSS (Global Navigation Satellite System), and the digital maps used by navigation systems. This invention is therefore applicable to all kinds of navigation systems, position reading devices and GNSS enabled units including, but not limited to, handheld devices, PDAs, mobile telephones with navigation software, and in-car navigation systems operating as removable or built-in devices. The invention can be implemented in any type of standard navigation system available on the market, on mapping and navigation web sites/servers as far as energy efficient route planning is concerned, as well as suitable systems which may be developed in the future.

The navigation-capable device typically includes a computer readable medium having navigation software recorded thereon. A microprocessor associated with the device may be programmed to provisionally match the navigation device to a particular road segment in a digital map and then to make an assessment whether the provisional match is reliable. If not reliable, the system may rely on other techniques to determine the position of the navigation-capable device, such an auxiliary inertial guidance system for example. Such inertial guidance systems may also include other features such as a DMI (Distance Measurement Instrument), which is a form of odometer for measuring the distance traveled by the vehicle through the number of rotations of one or more wheels. Inertial measurement units (IMUS) may be implemented with gyro units arranged to measure rotational accelerations, with suitable accelerometers arranged to measure translational accelerations. The processor inside the navigation device may be further connected to a receiver of broadband information, a digital communication network and/or a cellular network.

A microprocessor of the type provided with the navigation device according to this invention may comprise a processor carrying out arithmetic operations. A processor is usually connected to a plurality of memory components including a hard disk, read only memory, electrically erasable programmable read only memory, and random access memory. However, not all of these memory types may be required. The processor is typically connected to a feature for inputting instructions, data or the like by a user in the form of a keyboard, touch screen and/or voice converter.

The processor may further be connected to a communication network via a wireless connection, for instance the public switch telephone network, a local area network, a wide area network, the Internet or the like by means of a suitable input/output device. In this mode, the processor may be arranged to communicate as a transmitter with other communication devices through the network. As such, the navigation-capable device may transmit its coordinates, data and time stamps to an appropriate collection service and/or to a traffic service center.

As stated previously, it is known that improved fuel efficiency can be achieved by maintaining a constant, optimal vehicle speed. As a rule of thumb, this constant vehicle speed may be approximately 45-60 mph, however that range may vary from one vehicle type to another, as well as being influenced by environmental conditions, road geographies, and the like. It is further known that various road characteristics such as sharp turns, speed bumps, lane expansions/consolidations, traffic controls and other features can influence the ability to safely travel at a constant speed along a particular segment. For this reason, the subject invention provides new, detailed map content to be used in connection with the navigation software applications to provide optimal energy-efficient driving speed recommendations.

Figure 4:
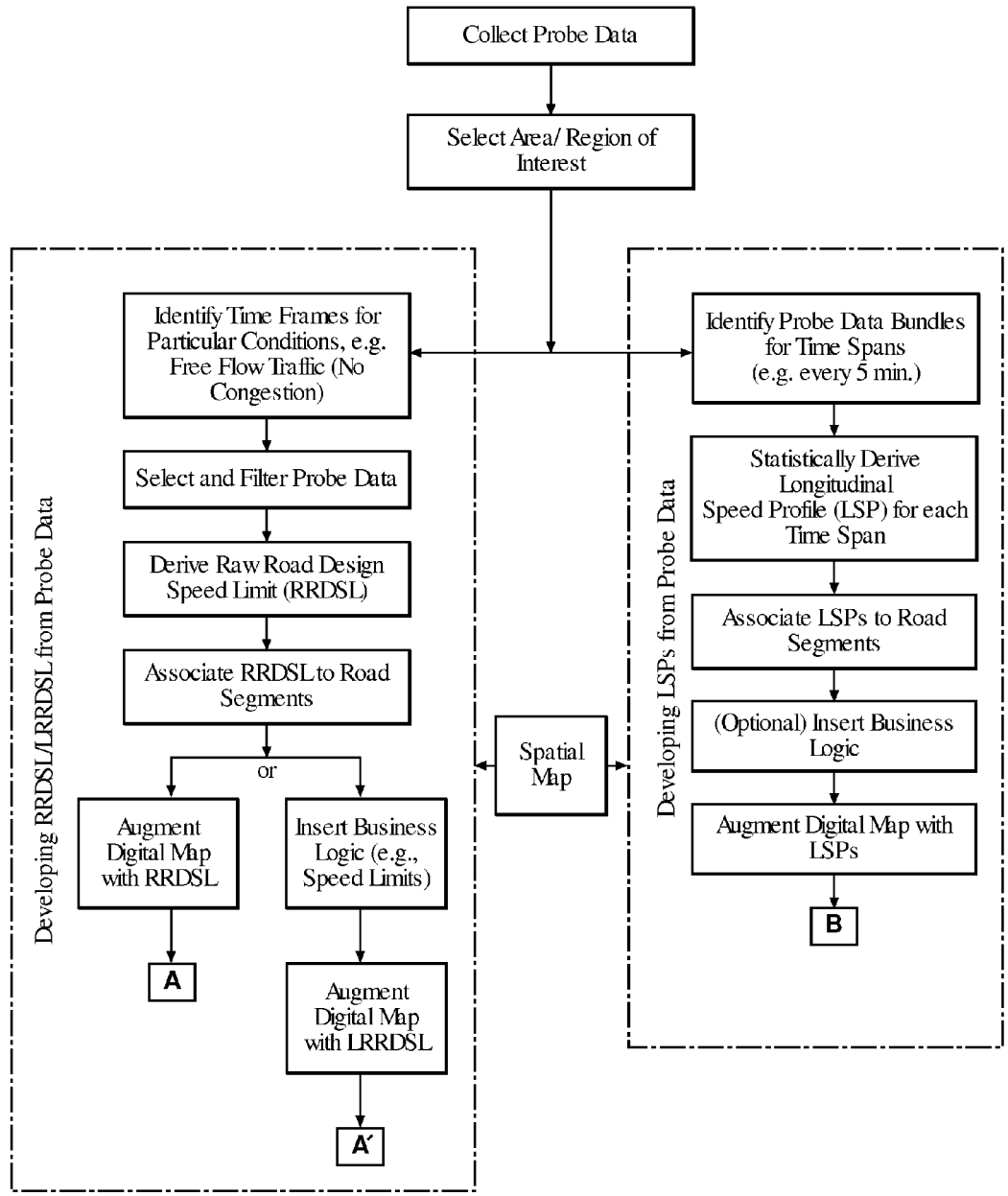
FIG. 4 is a flow diagram describing the derivation of a Raw Road Design Speed Limit (RRDSL) and/or a Legal Raw Road Design Speed Limit (LRRDSL) from probe data, together with the creation of Longitudinal Speed Profiles (LSP) from probe data.

A Raw Road Design Speed Limit (RRDSL) may be derived from the collected probe data, according to the steps outlined in FIG. 4. With regard to determining an RRDSL, the first step is to identify the time frame during which free flow traffic (no congestion) occurs. Once this free flow time span is known, the probe data for that time span is bundled, and then statistically analyzed to derive the speed at every point along the link, i.e., the road segment. Alternatively to selecting an optimal time span, the probe data can be analyzed to identify the higher probe speeds regardless of the time span. This process of deriving the speed at every point along the link is carried out for every road segment (or as many segments as practical. The RRDSL may be associated with its respective segment as an attribute. In this manner, the digital map is augmented with the RRDSL attribute. Additionally, an attribute reflecting the averaged or longitudinal statistical information of the probe data along the road element (e.g. standard deviation) can be added to the digital map.

The RRDSL represents the longitudinally variable (vehicle) speed at any location along a road section in one direction where no obstructions to traffic are observed. The RRDSL for each road segment is either taken from probe data at a time span where free flow traffic conditions are observed, or taken from probe data possessing the highest speeds regardless of the time span. For many road segments, free flow conditions will occur in the early morning hours when the fewest number of vehicles are traveling the roads. Thus, a speed profile (like that obtained from the TomTom IQ Routes™ product) taken at the time of the least traffic congestion may be somewhat similar to the RRDSL for a given road segment, but the IQ Routes™ speed profile will be a single average speed for the entire road segment whereas the RRDSL will typically have speed changes along the length of the road segment.

The RRDSL is thus characteristic for specific locations along a road link and renders all effects which physically restrict the vehicles from going faster. As the information is derived from vehicle probes and reflects true driving, it may at times exceed the legal speed restriction. When the RRDSL is represented along a road in a continuous or semi continuous way, one could call it an undisturbed speed which, when driven, is influenced primarily by the physical attributes of the road segment (e.g., its geometry) and the posted speed limits (if any). The RRDSL can therefore be classified an attribute of a road segment; it does not vary over time of day. Only when road construction changes or road furniture is changed, or probe statistics change, is the RRDSL expected to change. As an attribute, it is possible to consider future applications of this concept in which, for example, a percentage of the stored RRDSL could be taken in case weather/surface conditions are known. As probe data content and resolution improvements are available, lane and/or vehicle category dependencies may be represented in the RRDSL. For example, with sufficient data content, the RRDSL may reflect regulatory situations such as higher speed limit on left lane or lower speed limit for commercial vehicles, etc. That is, the RRDSL can optionally be dependent on the specific vehicle type, or more generalized in vehicle categories (e.g. Powered Two Wheeler, Heavy Truck, Light Commercial Vehicle or Passenger car). The RRDSL is particularly useful for Advanced Driver Assistance (ADAS) and other driving control purposes.

Accordingly, the RRDSL is derived from selected and filtered probe data which has been collected during periods of time when traffic flow is at or near its lowest for a particular road segment, i.e., at free flow conditions, or which has demonstrated the highest speeds. The RRDSL 16 is a function of the longitudinal profile, based on position along a road section and of the travel-based direction profile (i.e., f(p, d)). One might possibly consider the RRDSL 16 also a function a time-interval based profile as well as of a lane-specific profile (i.e., f(p, d, t, l)) if one wishes to accommodate longer-term changes such as constructions, change in road furniture, and the like.

Figure 3:
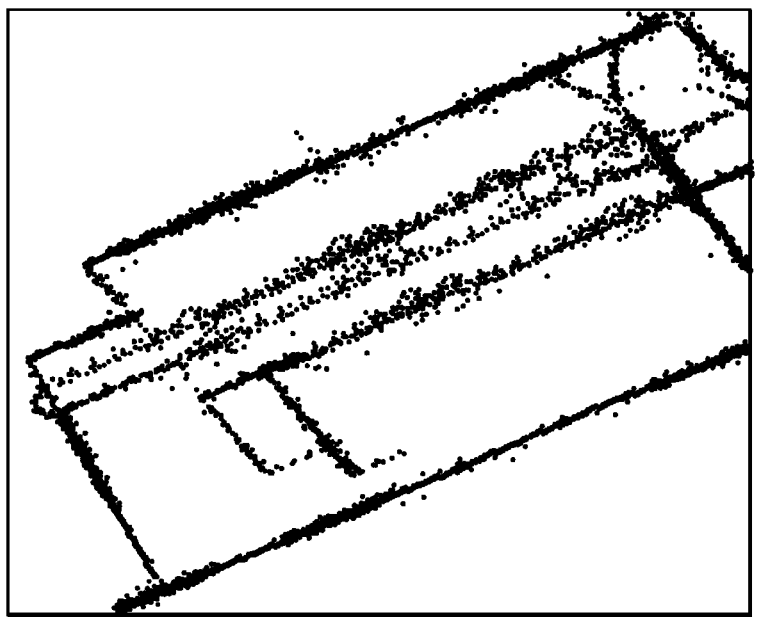
FIG. 3 is an example of raw probe data reflecting latitudinal and longitudinal positions (i.e., relative to road centreline) collected from a downtown, city-center area of Ottawa, Canada.
Figure 5:
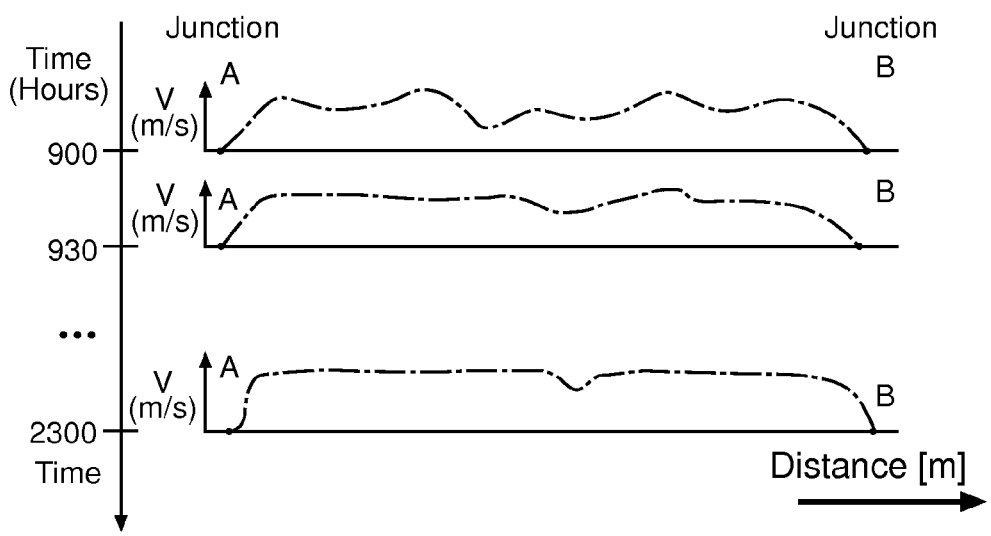
FIG. 5 is a chart showing the derived Longitudinal Speed Profiles (LSPs) for a particular road segment (AB), for a particular direction of travel, during different time spans, in this example in 30-minute increments.

FIG. 5 shows exemplary Longitudinal Speed Profiles (LSPs) derived from probe data (like that of FIG. 3) for a hypothetical road segment (AB), for a particular direction of travel, during consecutive 30-minute time spans. Unlike the traditional speed profiles taught, for example, by the IQ Routes™ product, these profiles represent longitudinally (i.e., in the direction of the road centreline) varying average speed distributions of vehicles derived from probe information, driving along the same section of the road and direction. These LSPs describe velocity variations along the length of a link or road segment for a specified time span. For the time span(s) which coincide with free flow traffic conditions, the LSP will be equivalent to the RRDSL 16. Once derived from the collected probe data, the LSPs are associated with the respective road segment and either stored in a stand-alone database or added to an existing digital map as a data layer.

Figure 6:
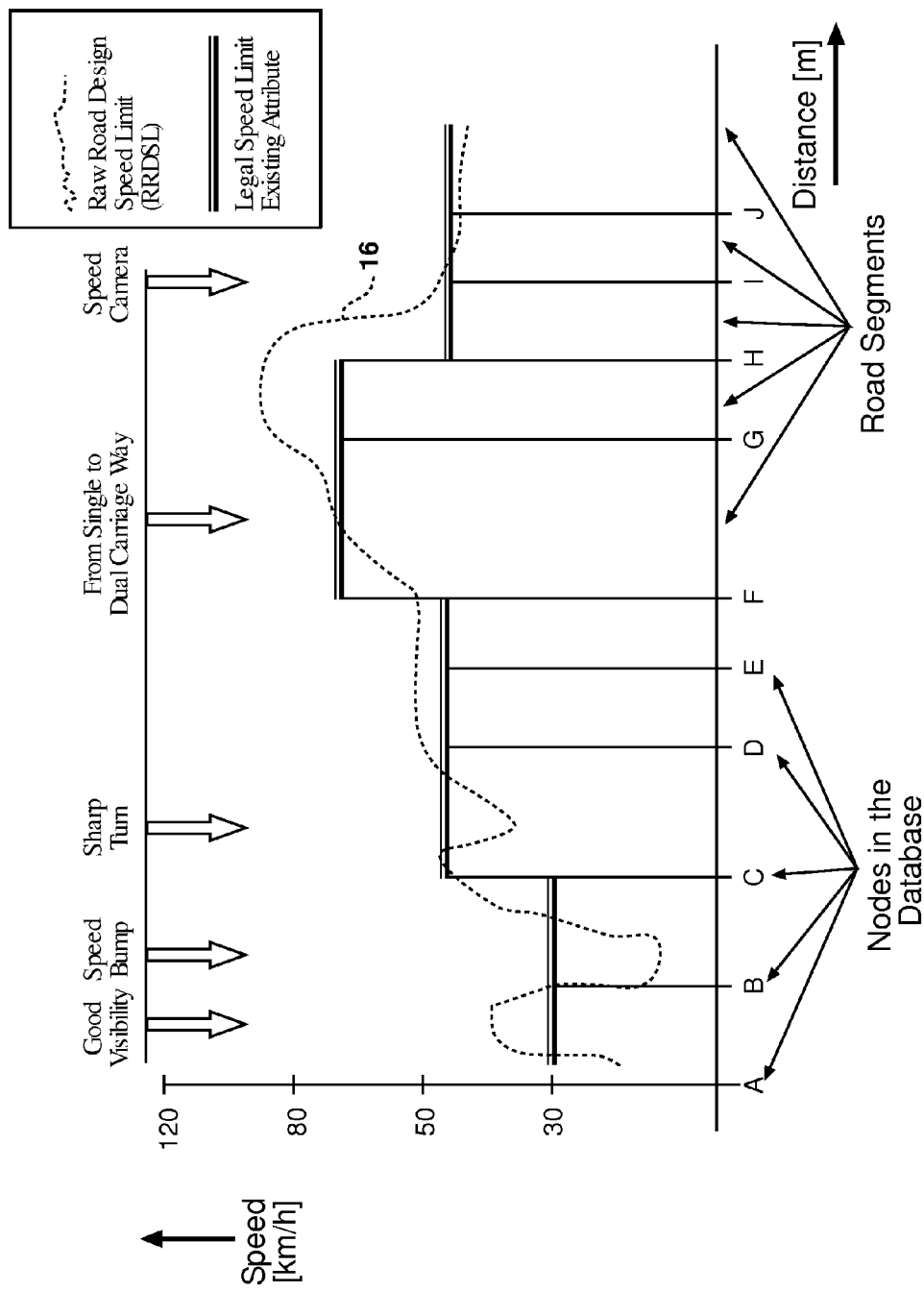
FIG. 6 is a diagram representing the posted speed limit for several consecutive road segments (AB-IJ), together with the RRDSL (16) for the same road segments.

FIG. 6 is a sample chart depicting consecutive road segments AB, BC, . . . IJ. Each road segment has a legal speed limit which is recorded in the digital map as an attribute. These speed limits are represented by the heavy, horizontal lines occurring at 30, 50 and 75 km/h. Broken line 16 represents the RRDSL for the same road segments (AB, BC, . . . IJ) which has been developed by bundling probe data recorded during an optimal time span (e.g., 0200-0230) and then averaging the results. Variations in the RRDSL 16 speeds can be attributed to features and geometries and attributes associated with each road segment, as suggested along the upper margin of the illustration. Features such as good physical visibility e.g. no obstructions or objects in line of sight, and expansion of roadway from single to dual carriageways are shown to result in velocity increases in the RRDSL 16 speed, whereas features such as speed bumps, sharp turns and speed cameras mark declines in the RRDSL 16 speed, in many instances below the legal speed limit. The RRDSL 16 can vary even within the context of a single road segment, is associated in the digital map with the particular road segments and made available to navigation-capable devices which utilize the digital map in an interactive manner. As suggested earlier, one embodiment of this invention contemplates a target driving speed derived by considering the dynamic environmental situation (e.g., degraded road surface conditions or poor weather) and calculating a fraction of the RRDSL.

The RRDSL 16 can be attributed to its associated road segment in a digital map database in various ways. For some examples, an RRDSL 16 can be represented and stored as a parametric curve as a function of distance, or perhaps as a set of discrete optimal speeds between which to linearly interpolate, or normalized variations (percentages) above and below a legal speed limit/artificial threshold, to name a few possibilities. Those of skill in the field of digital map database construction and implementation will readily appreciate these and possible other suitable techniques how to represent and store an RRDSL 16 in a map database. Furthermore, various averages can be stored in a digital map, and provided for different types of vehicles. In the case of multi-lane road segments, e.g., dual carriageways, variations in such profiles can also be lane dependent. In addition, a sub attribute representing the statistical signal of the RRDSL 16, e.g. in the form of a standard deviation, can be stored in the map as well. Either as an average value, or as a longitudinal varying representation along the road element.

Once the RRDSL 16 has been determined, and then associated with road segments in a digital map, a driver operating with a navigation-capable device is able to continually compare their current speed (derived from successive GPS coordinates of the current time, or optionally derived from in-car sensor data) with the undisturbed speeds represented by the RRDSL 16 for the particular road segment. In the event of bad weather, environmental or surface conditions, a percentage of the RRDSL 16 may be used instead of the actual derived speeds which is proportional to the degraded driving conditions. The navigation device then provides successive instructions or suggestions to the driver in audible, visual and/or haptic form, so that the driver might alter their driving speed to match or more closely mimic the target speeds along the road segment on which the vehicle is currently traveling. As a result, the driver can expect to optimize their use of fuel in the most realistic manner possible, because the free flow conditions (upon with the RRDSL 16 was derived) represent the closest to steady-speed operation taking into account the practical considerations of road geometry and other real-world factors that influence driving speeds. This not only reduces operating costs of the vehicle, but also reduces vehicle emissions to the atmosphere and can improve driver comfort by reducing driver stress and fatigue. In more advanced systems, including the so-called ADAS applications which partly automate or take over driving tasks, the navigation device may even take an active role in conforming the current speed to the RRDSL 16 speeds. Thus, in order to achieve high energy conservation, sensory signals (e.g., audible, visual and/or haptic) will be activated by the navigation device if the current, instantaneous speed of the carrying vehicle exceeds the RRDSL 16 target speed by some threshold value. For example, a threshold value of ±5 km/h, or a percentage (e.g., 10%) may be established.

As shown in FIG. 6, it is foreseeable that, in many real life situations, the RRDSL 16 will at times exceed the posted legal speed limits for a particular road segment. It is possible, indeed perhaps even preferable, therefore to reduce the target speeds of the RRDSL 16 to the legal speed limit whenever it exceeds the established speed limit at any point along the particular road segment. Thus, as shown in FIG. 6, the target speeds may be capped at each point where it rises above the local legal speed limit, resulting in a so-called Legal Raw Road Design Speed Limit (LRRDSL) 17. It is to be understood, however, that use of the term "legal" in this context does not preclude strategic limitation of the RRDSL speeds for reasons other than compliance with local speed regulations. For example, road segments in some jurisdictions may not impose any upper speed limit. This is sometimes the case along sections of the Autobahn in Germany for example. Applying principles of this invention to such unrestricted sections of roadway may result in a distribution of probe speeds with a very large spread, e.g., real speeds between 100 kph and 200 kph. In such cases, it may be advisable to impose an artificial maximum threshold that is mindful of fuel economy statistics. Thus, for example, in road segments without legal speed limits, an artificial maximum threshold of 110 kph might be established, and used to limit the LRRDSL 17 where ever it exceeds the artificial threshold.

Figure 7:
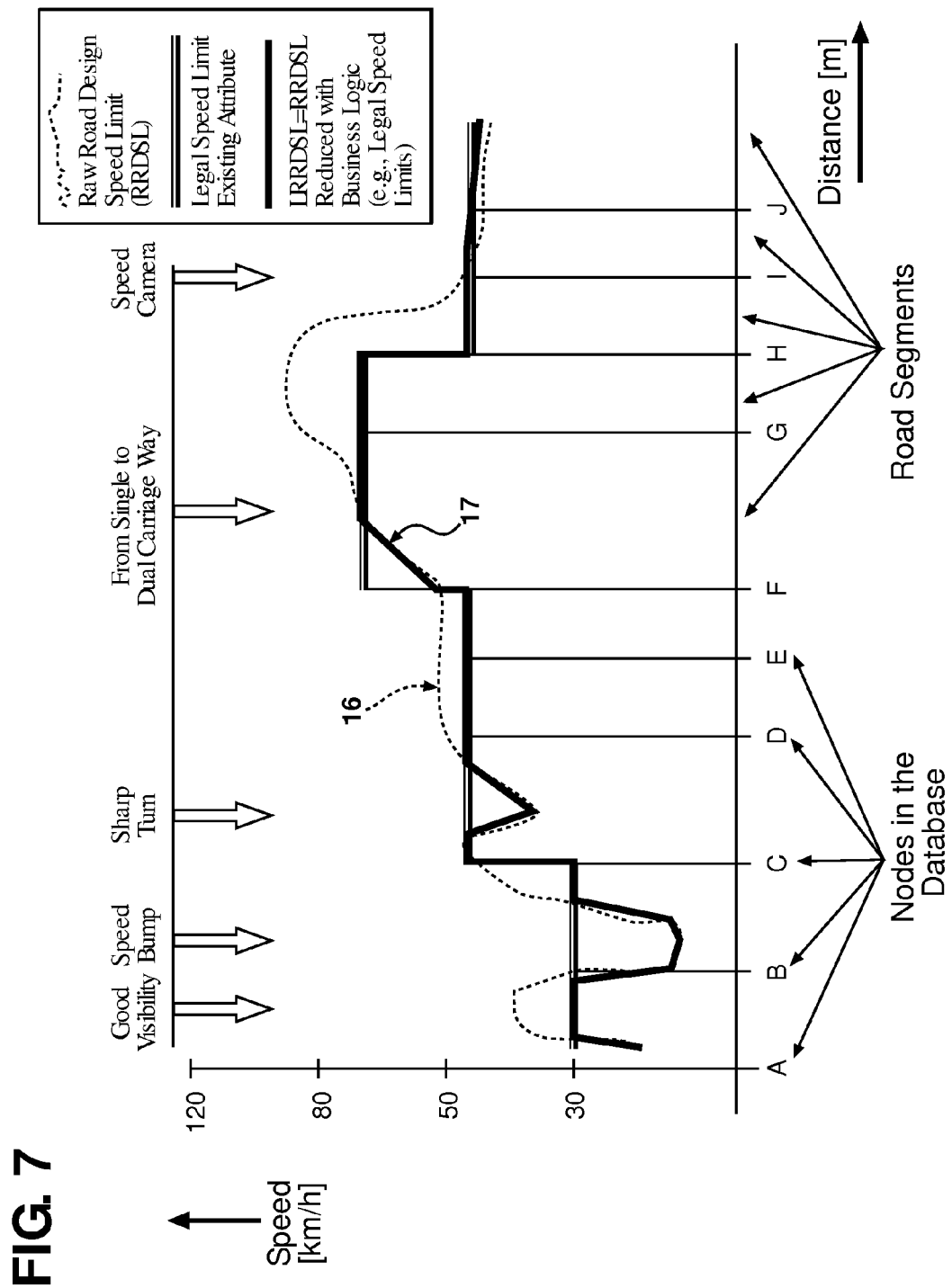
FIG. 7 is a diagram as in FIG. 6 but showing also the LRRDSL (17) for the same road segments (AB-IJ)

As will be appreciated by reference to the RRDSL 16 and LRRDSL 17 curves as shown in FIG. 7, sharp changes may sometimes occur in the target speed. Sharp target speed increases require heavy acceleration, whereas sharp target speed decreases require strong deceleration. To improve energy efficiency amid sharp changes in the target speed, an Optimal Longitudinal Speed Profile (OLSP) 18 may be introduced. The OLSP 18 is a fluent profile that reflects driving without too many accelerations/decelerations and thus represents minimal energy losses.

Figure 8:
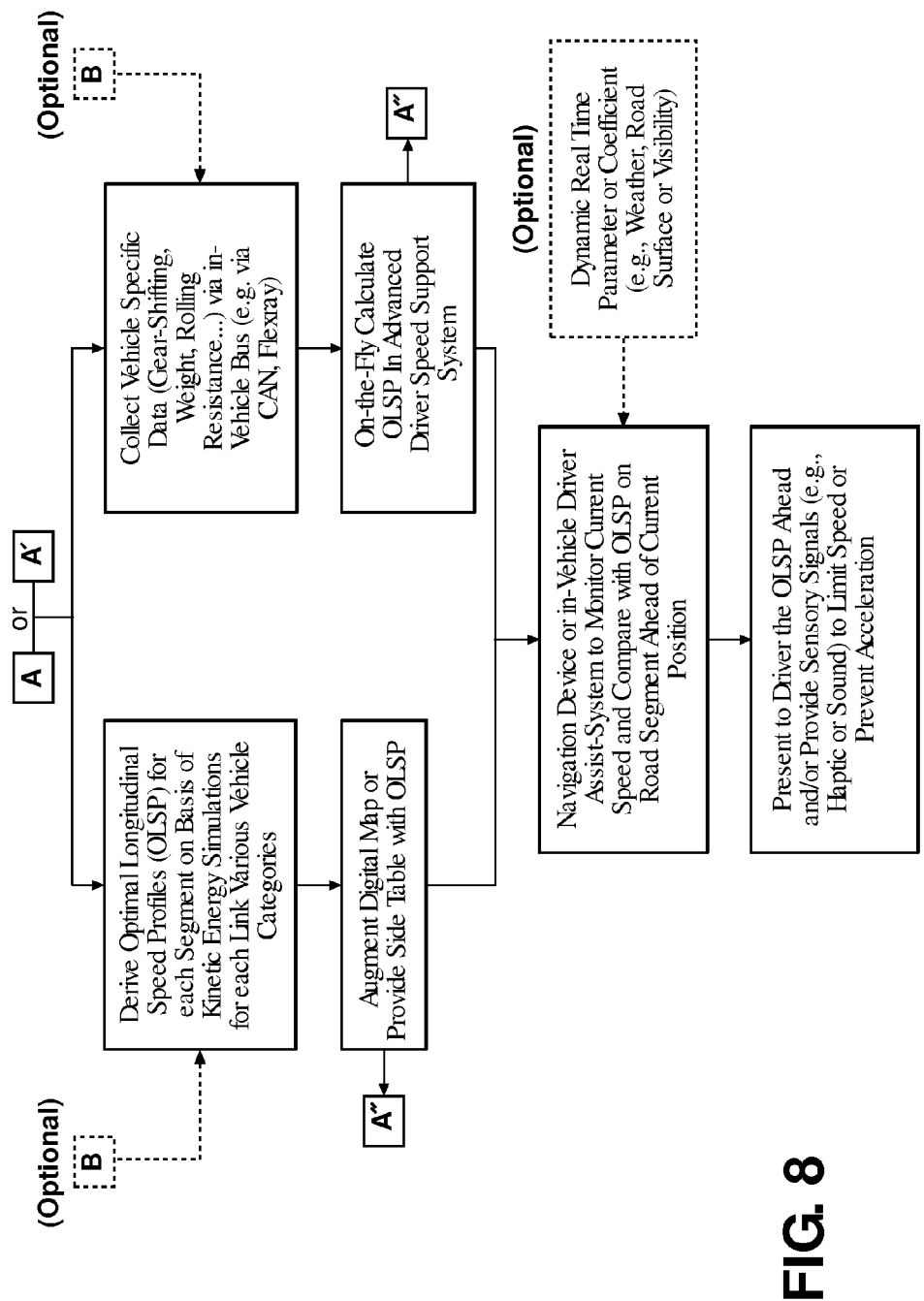
FIG. 8 is a flow diagram describing the derivation of an Optimum Longitudinal Speed Profile (OLSP) from either the RRDSL or LRRDSL, for a particular direction of travel.

The flow chart of FIG. 8 describes two alternative approaches to deriving the OLSP 18. In one approach, the OLSP 18 is derived on the basis of kinetic energy simulations for various vehicle types or categories. In this case, the OLSP 18 is simply attributed to the respective road segment in the digital map. Alternatively, the OLSP 18 can be computed dynamically, i.e., on the fly, on the basis of data specific to the vehicle. Regardless of the method used, the target speed dictated by the OLSP attribute 18 is then used as the standard against which current vehicle speed is compared. As shown, an optional step "Dynamic real time parameter or coefficient (e.g. weather, road surface or visibility)" may feed into the step "Navigation Device or In-vehicle Driver Assist system to monitor current speed and compare with OLSP on road segment ahead of current position." This enhanced real time OLSP 18 can alternatively be applied to the RRDSL 16 or the LRRDSL 17. The dynamic parameter could be manifested as an absolute delta speed, or a relative speed differential (i.e., a percentage) or speed that is categorised/indexed (e.g., low/med/high) to the OLSP 18 (or the RRDSL 16 or LRRDSL 17). This dynamic parameter may be provided to the navigation device 10 so that the system can calculate navigation and driving guidance instructions taking into account the real time dynamic situation, relative to the free flow target speed indicated by the OLSP 18 (or the RRDSL 16 or LRRDSL 17). In addition, information can be provided to the navigation device 10 identifying the cause of the change of the parameter (e.g. congestion, partly road/lane closure, road works, road surface conditions, visibility, weather, events and incidents, etc.)

Figure 9:
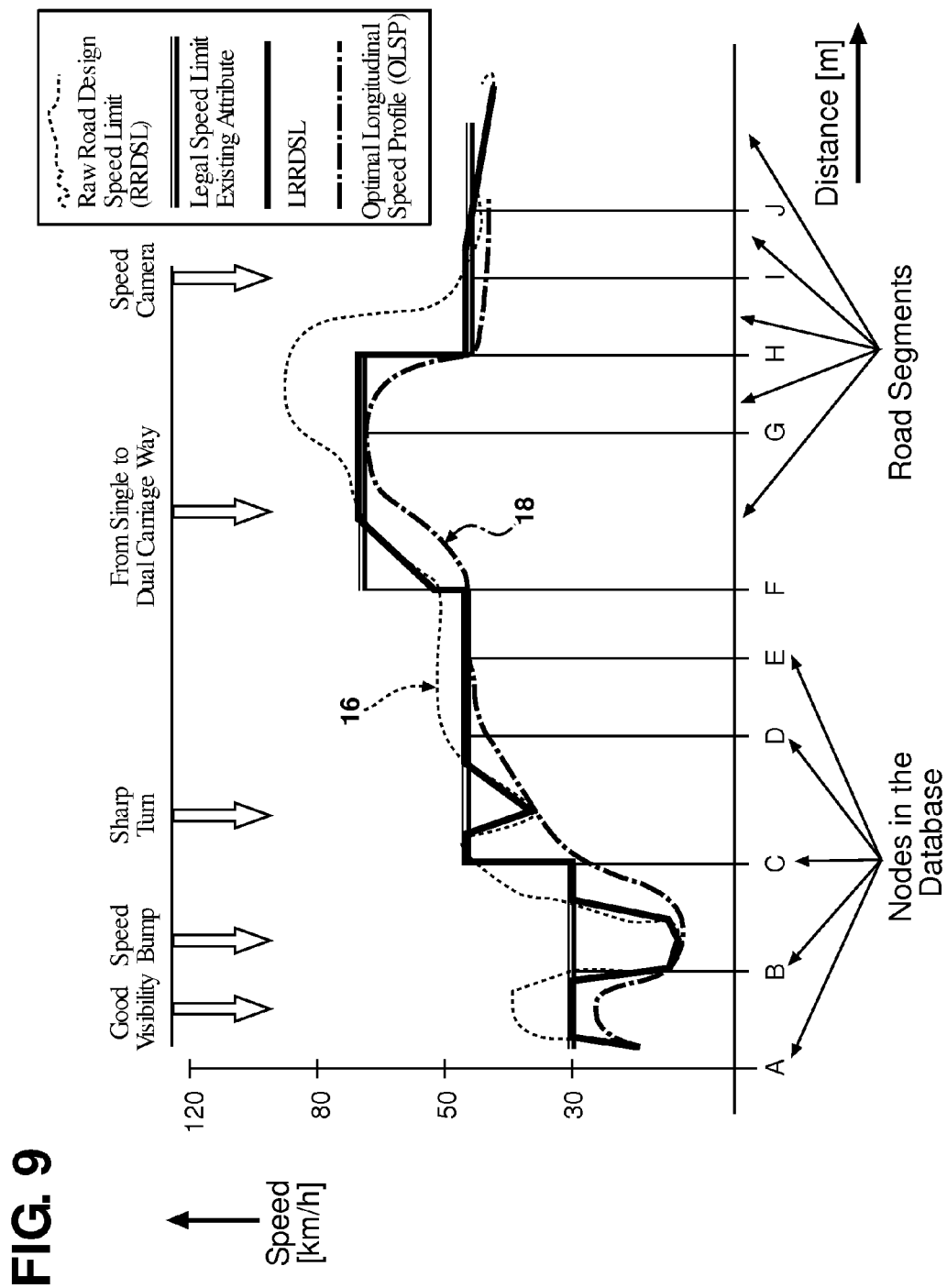
FIG. 9 is a diagram as in FIG. 7 but showing also the OLSP for the same road segments (AB-IJ)

Ideally, the comparison is proactive, in the sense that it is made on the road segment ahead of the current position so that an appropriate sensory signal (e.g., visual, sound, haptic, etc.) can be issued, considered by the driver and reacted upon in time with the movement of the vehicle. FIG. 9 shows the diagram of FIG. 7 superimposed with an OLSP 18. The OLSP 18, like the RRDSL 16, is also a function of the longitudinal profile, based on position along a road section and of the travel-based direction (i.e., f(p, d)). It may also be a function of vehicle category (passenger car, bus/truck, powered two-wheeler), and is also preferably, but not necessarily, a function of a regulation dependency (like the LRRDSL 17). Apart from being efficient due to minimal accelerations, minimizing the energy spend over the road segment also reflects a speed which will be close to the legal speed limit on the higher road classes. In fact, vehicle manufacturers typically optimize the power trains of their vehicles to be most efficient between 85-95% of their top speed, which nearly always reflects the legal speed or speed restrictions in the region. Stated simply, the OLSP 18 is a continuous or semi-continuous averaged speed distribution of vehicles driving along the same road and direction, considering the RRDSL 16 or the LRRDSL 17, and minimizing the number of accelerations/decelerations but keeping close to the RRDSL 16 (or LRRDSL 17) when no junctions are approached. Again, the term "longitudinal" appearing in the OLSP refers to the (semi) continuous description of this information along a road's axis. The highest average speed profiles are represented by the RRDSL 16. Using the RRDSL 16, or rather the trimmed version LRRDSL 17, the OLSP 18 can be calculated by investigating the changes in energy involved in the system.

Computing the OLSP 18 respects the difference between the need for acceleration changes to be as small as possible, and keeping a fluent profile whilst keeping the vehicle in a speed zone for which the manufacturer optimized the functioning of its power train. Those of skill in the field will appreciate various methods to derive the OLSP 18 from the LRRDSL 17 (or if preferred from the RRDSL 16). With regards to derivation of the optimal acceleration and decoration strategy, there exist some models in the state of the art that can be well used for this purpose. In one approach, boundaries are set on acceleration values. See, for example, the Optimal Velocity Profile Generation for Given Acceleration Limits described at: http://soliton.ae.gatech.edu/people/ptsiotra/Papers/acc05b.pdf. In another approach, mathematical models can be constructed to predict energy costs for motor vehicles along roads. These models are fed with vehicle characteristics and a specific longitudinal speed profile. Linked to the energy estimation models are those which predict fuel cost and emission values. Modeling examples include PAMVEC, ARFCOM, and ARTEMIS. Details about the PAMVEC model can be found at: htitee.uq.edu.au/~serl/_pamvec/PhD_Thesis_AGS Chap3.pdf. Details about the ARFCOM model can be found at: transport links. org/ transport_links/filearea/ publications/1_773_PA3639.pdf. Details about the ARTEMIS model can be found at: epa.gov/ttn/chief/conference/ei18/session6/andre.pdf.

Figure 10:
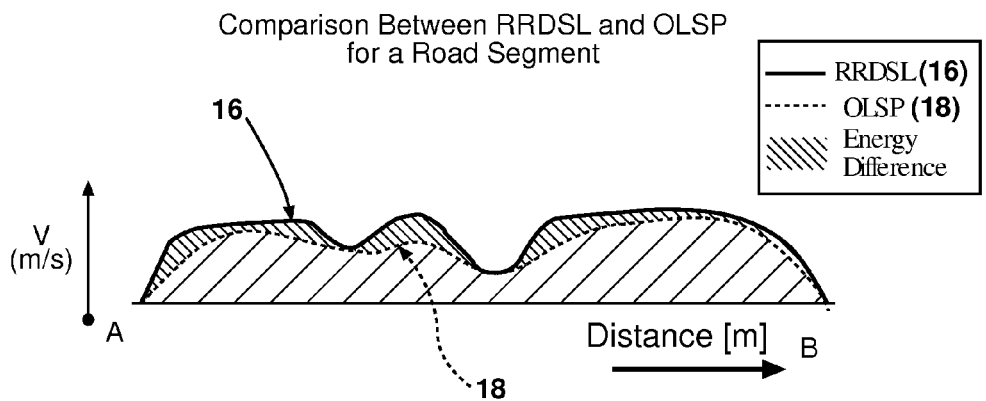
FIG. 10 is a simplified longitudinal speed diagram for a road segment AB, showing both the RRDSL and OLSP, with energy savings represented by the OLSP being shown as an energy difference between the curves.

The energy difference optimized by the OLSP 18 in relation to the RRDSL 16 is represented in FIG. 10 by the shaded area. The energy saved by observing the OLSP 18 rather than the RRDSL 16 is proportional to the available energy conservation. Individual vehicles driving according to the OLSP 18 will be using less fuel. The surrounding traffic will be influenced with the behaviour of the vehicles driving according to the recommendations based on the OLSP 18 (or an OLSP 18 enhanced with a dynamic parameter). Thus, the OLSP 18 will not only impact the vehicles actually using the information but will also have a significant and beneficial secondary impact on surrounding traffic.

Figure 2:
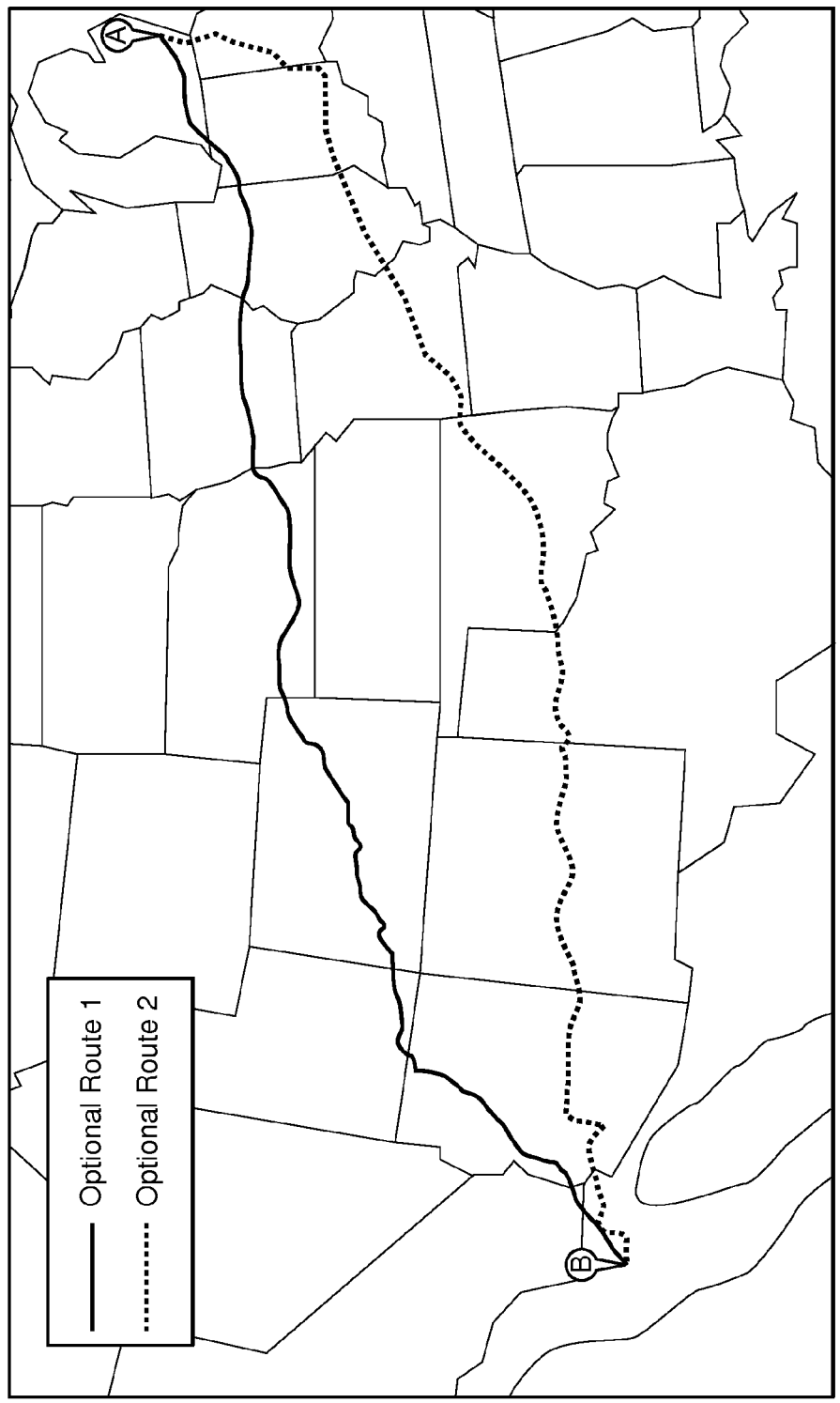
FIG. 2 is a sample portion of a digital map depicting alternative routes between Detroit and Los Angeles which can be separately assessed for fuel economy prediction.

Personal navigation devices 10 like those described above are particularly efficient at comparing many different routes between an origination and destination location and determining the best possible or optimum route, as shown in FIG. 2. Typically, such route planning algorithms consider a so-called cost attribute associated with each possible link in the network which is sought to be minimized or maximized by the navigation/route planning software. This type of route planning technique is well known for determining the fastest, shortest or other cost criteria route between two points. However, until now there has not been a convenient method by which the most energy efficient route can be calculated between two points and then offered to a user in preference to a route calculated according to some traditional basis. Using the technique of calculating the LSPs it is possible to derive also an energy cost for each link in the network for each time span. Because the LSP at free flow conditions (i.e., at the time span with the highest observed speed distributions) is equivalent to the RRDSL 16, a special case of the energy cost at the free flow time span can be determined by reference to the RRDSL 16. It follows, therefore, that a useful version of the energy cost for free flow conditions specifically can also be determined by reference to either the LRRDSL 17 or the OLSP 18.

Figure 11:
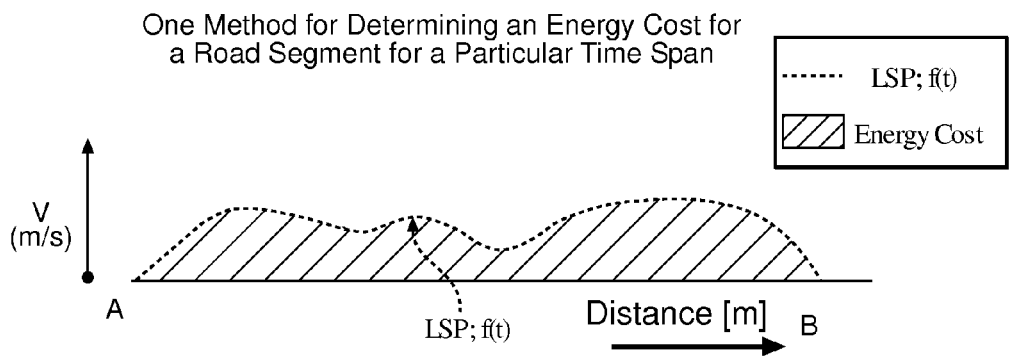
FIG. 11 describes one method for determining an energy cost for a road segment for a particular time span.

FIG. 11 shows one method by which a longitudinally distributed energy cost can be determined for any road segment, in this example road segment AB. In this figure, Energy Cost is calculated on the basis of the area under the LSP for the road segment AB for a time span. However, it may be useful in some cases to simply calculate a singe Energy Cost for the road segment AB which is not time dependent. In these special situations, the LRRDSL 17 may be used, as it represents the LSP for segment AB at the free flow time span. Or perhaps, a (pragmatically) optimal, time independent Energy Cost could be calculated on the basis of the OLSP 18, which also corresponds to the LSP for segment AB at the free flow time span. Although not preferred, it is likewise possible also to derive a time independent Energy Cost from the RRDSL 16.

The energy cost is preferably indexed to the time intervals for the LSPs, e.g., every five minutes or every half hour as in FIG. 5. Therefore, this energy cost would be derived from real traffic information as collected from the probe data, and thus incorporate dynamic aspects as well as static aspects attributable to road geometries and the like. However, it may be useful in some routing applications to consider only the special case of energy cost during free flow conditions, which can be derived from any of the RRDSL 16, LRRDSL 17 or OLSP 18 due to their correspondence with the LSP for the free flow time span.

The energy cost can be represented as cost information and associated directly with each link, i.e., with each segment between two nodes in a digital map, and thereby represent a cost criteria related to energy consumption over that link. Thus, the energy cost is calculated at least from the speed and acceleration profiles (i.e., LSPs) obtained from probe data and is relative to other links on the map. The average velocity profile and average acceleration profile are particularly relevant in view of the parametric approach to modeling vehicle energy consumption founded upon the well-known road load equation:

$$P_{road} = P_{aero} + P_{roll} + P_{accel} + P_{grade}$$

$$= \frac{1}{2}\rho C_D A v^3 + C_{RR} m_{total} g v + k_m m_{total} a v + m_{total} g Z v$$

Where:
$P_{road}$ is the road load power (W),
v is the vehicle speed (m/s),
a is the vehicle acceleration (m/s$_2$),
$\rho$ is the density of air (~1.2 kg/m$_3$),
$C_D$ is the aerodynamic drag coefficient,
A is the frontal area (m$_2$),
$C_{RR}$ is the rolling resistance coefficient,
$m_{total}$ is the total vehicle mass (kg),
g is the gravitational acceleration (9.81 m/s$_2$),
Z is the road gradient (%) and
$k_m$ is a factor to account for the rotational inertia of the power train (Plotkin et al. (2001) use a value of $k_m$=1.1 while Moore (1996) uses a value of $k_m$=1.2).

In this equation, acceleration loads ($P_{accel}$) are typically more heavily weighted than resistance due to aerodynamic drag ($P_{aero}$) or resistance due to rolling ($P_{roll}$) or resistance due to gravitation forces ($P_{grade}$). As shown in the equation above, the load due to acceleration ($P_{accel}$) includes the product of acceleration times velocity (av). Thus, by establishing the speed-acceleration index (av) as a parameter used in the average energy value and determined for each link in the network, a substantially reliable prediction or estimation can be made on a universal basis as to the energy required by any vehicle to traverse the link. In other words, while the specific amount of energy will vary from one vehicle to the next depending upon a great many conditions and variables, the speed-acceleration index will serve as a useful estimation tool so that routing algorithms can apply at least a simplified version of the average energy value as a cost and choose the best route between two locations in a digital map by attempting to minimize the energy loss.

An alternative technique for determining energy cost for a road segment (hypothetically AB) is to take the first derivative of the LSP, which may be characterized as an acceleration profile. Using this acceleration profile, it is possible to keep track of the number of accelerations and decelerations above a set threshold. This count can then be assigned to a road segment. Such an acceleration profile would provide a simplified was to store information that in turn can be used to compute the energy cost. A routing algorithm would favor segments with high speed. On a higher level, the routing algorithm needs to identify chains of road segments with the overall minimum energy loss. This information can be used in navigation systems to select the least energy consuming route. Thus, the LSPs (or the LRRDSL 17, OLSP 18, or even the RRDSL 16, for time independent applications) can be used as a predictive or routing function to find an economical route by considering it in routing algorithms. Furthermore, the OLSP 18 can be used in conjunction with a suitable navigation device 10 to provide an instantaneous performance indicator by offering a reference signal to which real time comparisons can be made so as to advise the driver.

Figure 12:
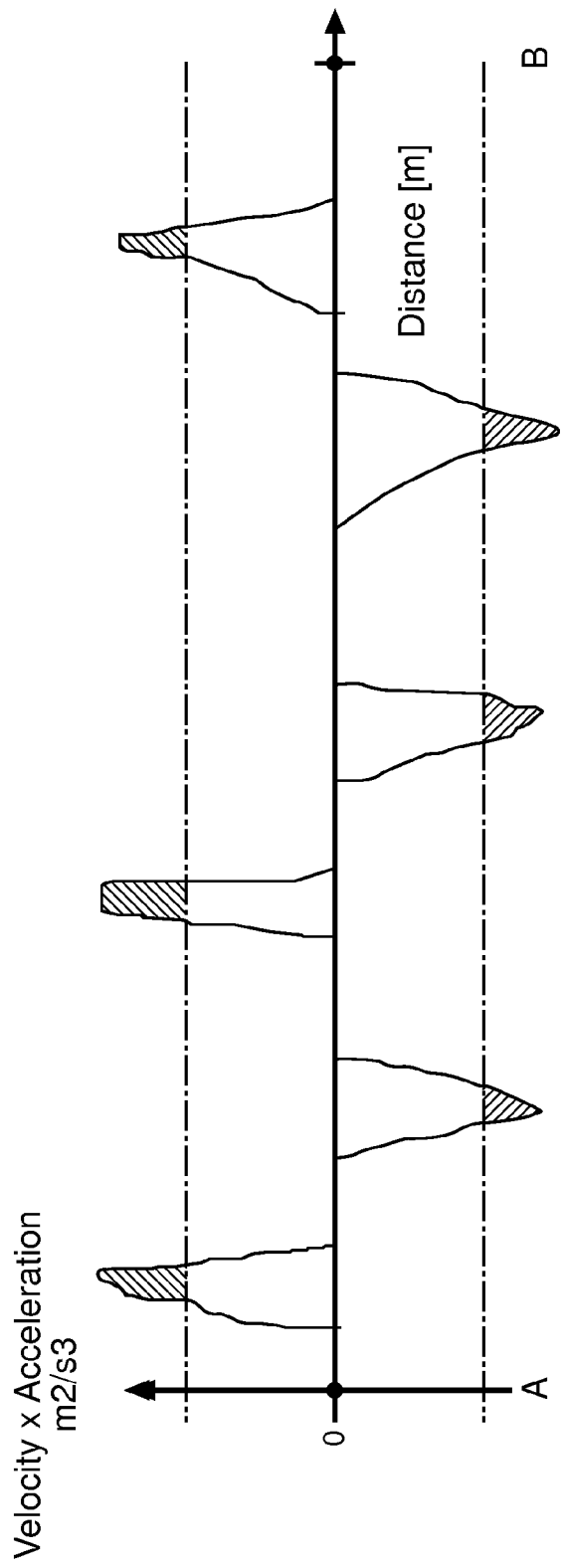
FIG. 12 illustrates another method for determining an energy cost for a road segment for a particular time span.

In FIG. 12, yet another method to compute the Energy Cost is presented as a velocity times acceleration index is plotted along the length of the link for a particular driving direction. As in the preceding alternate technique to determine the energy cost by creating an acceleration index, this method may also keep track of the number of peaks extending past a threshold. In FIG. 12, the threshold is shown as horizontal broken lines spaced equidistant from the x-axis, with the respective peaks extending past the threshold shaded. When the acceleration is null, or zero (i.e., constant velocity), the speed-acceleration index will be null/zero on the graph. Positive or top speed peaks will be created as the speed-acceleration index resides in positive territory, whereas negative or minimum speed peaks are shown during deceleration modes with negative values presenting. Thus, the energy cost can be complemented with the number of top and/or minimum peaks that exist along that link. This may be simply represented with an absolute number or expressed by some other efficient method. The number could be calculated using statistics on speed-acceleration indices derived from probe data on the link, for example. By this method, it is possible to conclude that an energy efficient routing application may include routing algorithms which compare the number of peaks and the magnitude of peaks along the speed-acceleration index between different links. Such a value could be automatically calculated and added to a digital map for each link complementary to the speed profiles and acceleration profiles provided in the time span divisions.

Accordingly, the energy cost associated with a particular road segment or link can be computed using many different techniques, including but not limited to those described here. Once computed, the energy cost may be compared on a link-by-link basis in the digital map to evaluate how much disturbance there is on any particular route. (Refer again to FIG. 2.) Once a preferred route has been established, the navigation system 10 can provide navigation assistance to the driver along that route to obtain the further improved fuel economy by observing the OLSP 18 described above. Thus, not only will the driver be able to calculate the most energy efficient route between two points, the driver will also be assisted to drive in an even more efficient manner along the route which takes into account geometric and other static road features along the entire route.

In a preferred embodiment, computation of an energy efficient route is using an index of energy costs which is based on LSPs as this takes into account the time-dependent nature of speed distribution along road segments. In another embodiment, energy efficient routing uses energy costs based on OLSP 18, or alternatively RRDSL 16 or LRRDSL 17, either of which is not a time-dependent LSP but represents ideal (free-flow) traffic conditions. This allows achieving at least a basic level of energy efficient routing, in that alternate routes can still be compared on basis of overall energy cost. In this way, the lowest possible overall energy cost for a desired route can be established. Depending on the choice for RRDSL 16, LRRDSL 17, or OLSP 18, three different characteristics of lowest possible overall energy cost are conceivable, as will be appreciated by a person skilled in the art. In yet another embodiment, energy cost based on LPS and energy cost based RRDSL 16, LRRDSL 17, or OLSP 18 can be considered in a combined view, in that the energy cost determined through LSPs is compared to the lowest possible overall energy cost (i.e. energy cost based on RRDSL 16, LRRDSL 17, or OLSP 18). Information about the efficiency comparison, expressed as ratio, percentage, normalized score or other suitable measure, may be recorded or presented to the user (such as an actual efficiency score). In a further embodiment, a user may preset an efficiency comparison target as part of the route planning exercise.

Thus, according to the principles of this invention, detailed speed and acceleration information can be calculated along each link in a network as derived from probe data in the form of time independent attributes of RRDSL 16, LRRDSL 17, and OLSP 18 or in the form of the time-dependant LSPs. Using one (or more) of these references, the energy consumption along the road can be approximated using various alternative techniques on the basis of one or more of these derived values. In fact, the energy consumption along a road can be even more accurately approximated if additional parameters are known such as: vehicle mass, air density, aerodynamic drag, frontal area, rolling resistance, gravitational acceleration, road gradient and rotational inertia of the power train. Calculating an energy cost may also include specialization by vehicle category, such as separate categories for trucks, passenger cars, buses, etc. The vehicle category-specific energy cost may then be derived from probe data bundled by vehicle category. In other words, probe data acquired from bus transits will be used to calculate an energy cost that is specific to buses, and so forth.

In conditions where some or all of these parameters are known, it may be preferable to aggregate this information into a single index which can be attributed to a link in a digital map database per travel direction or even per lane. This value can then be considered in the routing algorithm to prefer those links which most precisely minimize the energy consumption. These values can be computed using the well-known road equation set forth above in connection with the described parametric approach.

As stated previously, acceleration is the relative component to capture and assess the vehicle energy consumption. Changes in acceleration are quantified into a speed-acceleration index which is the product of vehicle acceleration and vehicle speed along the road link. One way to quantify the acceleration impact over a road link is to calculate the area enclosed by the speed-times-acceleration function, both for the area with positive and with negative acceleration. This is described with reference to FIG. 12 in which positive accelerations are shown above the null/zero line and negative accelerations below the null/zero line. Another, additional value that may be stored as an attribute of the road link can be the sum of the number of acceleration energy peaks above (and below) a predefined threshold, as represented by the broken horizontal lines in FIG. 12. (This can also be normalized over the length of the road link.) This would give a count of positive and negative acceleration energy peaks which, as stated previously, may be used to more fully develop an energy cost and provide an efficient estimating tool.

Aerodynamic resistance is also a valuable parameter. Here, the cube of vehicle velocity, as available in the detailed probe speed profiles, is of importance. One approach may be to quantify the energy consumption due to aerodynamic drag using thresholds (e.g., 30 km/h, 50 km/h, 90 km/h, 120 km/h) and to measure the length in meters for each section delimited by the thresholds. For example, a road of 1 km length, 250 m is in the 30-50 km/h, 500 m above the 120 km/h, and 250 m in the 50-90 km/h.

Rolling resistance is another parameter. The vehicle energy consumption is governed by the vehicle speed as described by the energy load equation stated previously. The quantification of this energy may be accomplished by adopting a similar approach as above—namely summing the length of the stretches of road where the vehicle speed falls within a specific category. Other parameters to assess the rolling resistance parameter can be to estimate the rolling resistance coefficient ($C_{rr}$), assume vehicle mass per class, or the like.

Loads due to road gradient are another factor. Vehicle mass may be assumed or given, and gravity is known. Therefore, the decisive parameters to quantify the energy consumption due to road gradient are the product of the road gradient and the velocity. The road gradient is or will be available in most digital map databases. The product of speed and road gradient along the road the vehicle travels results in a signal similar to the speed-acceleration index. Thus, a similar positive and negative peaks calculation may prove useful. However, as a somewhat simpler alternative, the road gradient profile can be integrated along the road link to obtain its height. Allowing positive height in meters and negative height in meters should suffice to enable an accurate calculation.

Thus, a formula to calculate or estimate the energy consumption more accurately over each link in the map database may include any or all of the components mentioned above, but in all cases includes at least the speed-acceleration index (i.e., LSPs) as defined. By these techniques, an energy efficient routing algorithm effectively makes an estimation using the speed profiles and acceleration profiles derived from probe data so that very accurate and useful route planning and navigation assistance can be provided.

Like the OLSP 18, an acceleration index can also be attributed to its associated road segment in the digital map database in various ways. For some examples, an acceleration index can be represented and stored in a map database by approximation of the positive and negative peaks in terms of their position along a link together with the respective vertical size and horizontal width, or as a parametric curve as a function of distance, or perhaps as a set of discrete optimal speeds between which to linearly interpolate, normalized over the road link length, etc. Those of skill in the field of digital map database construction and implementation will readily appreciate these and possible other suitable techniques how to represent and store an acceleration index in a map database.

A vehicle speed reflecting an optimal, high efficiency speed is based on low traffic situations. Therefore, it is desirable to derive the attributes 16, 17, 18 from processing of other profiles resulting from a minimum amount of traffic. In an alternative embodiment however, the attributes 16, 17, 18 can be derived for different times spans on the basis of historic traffic situations using the derived LSP data. The derived attributes will preferably include accelerations and decelerations witnessed by all vehicles and/or by specific vehicle types such as heavy trucks, delivery vans and the like. These attributes are preferably derived for a particular driving direction, i.e., for each lane of a multi-lane road segment, at a particular time span or interval. As this data reflects driving behavior, it implicitly includes speed adaptations caused by infrastructure (traffic lights, curvy road segments, speed bumps, etc.) and perhaps eventually also by expert drivers. That is, drivers whose cars are equipped with devices to enhance fuel economy as well as drivers who have studied eco-friendly driving styles. The emphasis of the contribution of the latter may be determined when the probe signal from which the speed profiles are derived will identify classes of drivers and/or vehicle characteristics.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A method for creating Longitudinal Speed Profile (LSP) data, said method comprising the steps of:
    collecting probe data from a plurality of probes traversing a road segment in the form of vehicular traffic flow, each probe developing a respective probe trace comprising a sequence of discrete time-stamped probe positions;
    establishing daily time spans;
    bundling probe data recorded during each time span;
    statistically deriving Longitudinal Speed Profiles (LSPs) from the bundled probe data, the Longitudinal Speed Profiles (LSPs) describing the speed variations along the road segment during the respective time spans;
    associating the Longitudinal Speed Profiles (LSPs) with the road segment; and
    storing the Longitudinal Speed Profiles (LSPs) in a digital medium;
    said method further comprising the steps of:
    utilizing the Longitudinal Speed Profiles (LSPs) data to calculate by a processor an energy cost for a direction of travel supported by the link; and
    associating the energy cost with the road segment.

2. The method according to claim 1 wherein said step of statistically deriving Longitudinal Speed Profiles (LSPs) includes determining a given Longitudinal Speed Profile (LSP) individually per direction of travel along the associated road section.

3. The method according to claim 2 wherein said step of statistically deriving Longitudinal Speed Profiles (LSPs) includes determining a given Longitudinal Speed Profile (LSP) individually per driving lane of the associated road section.

4. The method according to claim 1 wherein said step of bundling probe data includes deriving at least one vehicle category-specific Longitudinal Speed Profile (LSP).

5. The method according to claim 1 further including the step of providing a digital map having at least one link corresponding to the road segment; and said step of storing the Longitudinal Speed Profiles (LSPs) including augmenting the digital map with a data layer containing the stored Longitudinal Speed Profiles (LSPs).

6. The method according to claim 1 wherein the digital map includes a network of links extending between an origin location and a destination location, calculating an energy cost for each link in the network, and further including the step of planning a route between the origin and the destination by analyzing the energy cost for alternative links in the network and preferring those links which minimize the energy cost.

7. The method according to claim 1 wherein said step of calculating an energy cost for the link includes adding the number of top and/or minimum speed peaks on that link.

8. The method according to claim 1 wherein said step of creating an energy cost includes at least one of: (i) taking the first derivative of speed over time as derived from the probe data; (ii) taking the probe data itself which already contains measured speed and/or acceleration values from specific sensors; (iii) quantifying the area enclosed by the speed-times-acceleration function, both for the area with positive and with negative acceleration; (iv) deriving at least one vehicle category-specific energy cost from probe data bundled by that vehicle category; (v) calculating an aerodynamic resistance, the energy cost being proportional to the aerodynamic resistance; (vi) calculating a rolling resistance, the energy cost being proportional to the rolling resistance; (vii) calculating a gradient, the energy cost being proportional to the gradient.

9. The method according to claim 1 wherein said step of establishing daily time spans includes at least one of: (i)

creating unique time spans for each day of the week; and (ii) creating unique time spans for national holidays.

10. A method for computing an energy efficient route between an origin location and a destination location in a digital map, said method comprising the steps of:

providing a digital map having a plurality of road segments represented therein by a network of links corresponding to road sections in reality supporting vehicular travel in at least one direction, the links extending between an origin location and a destination location;

collecting probe data from a plurality of probes traversing the links, each probe developing a respective probe trace comprising a sequence of discrete time-stamped probe positions;

establishing daily time spans;

bundling probe data recorded for each link during each time span;

statistically deriving Longitudinal Speed Profiles (LSPs) from the bundled probe data, the Longitudinal Speed Profiles (LSPs) describing the speed variations along the road segment during the respective time spans;

utilizing the Longitudinal Speed Profiles (LSPs) during at least one time span to calculate by a processor an energy cost for the direction of travel supported by the link;

planning a route between the origin and the destination by analyzing the energy cost for alternative link combinations in the network and preferring those links which minimize the energy cost.

11. The method of claim 10 further including the step of associating each energy cost to the respective link as an attribute in the digital map.

* * * * *